Oct. 4, 1966 E. W. CLARK 3,277,370
TAUT BAND SUSPENDED INSTRUMENT MOVEMENT WITH SHOCK
RESISTANT LONGITUDINAL MOVEMENT STOP
Filed Dec. 28, 1962 3 Sheets-Sheet 1

*INVENTOR.*
EARL W. CLARK
BY *W. J. Shanley, Jr.*
HIS ATTORNEY

Oct. 4, 1966 E. W. CLARK 3,277,370
TAUT BAND SUSPENDED INSTRUMENT MOVEMENT WITH SHOCK
RESISTANT LONGITUDINAL MOVEMENT STOP
Filed Dec. 28, 1962 3 Sheets-Sheet 2

INVENTOR.
EARL W. CLARK
BY
HIS ATTORNEY

Oct. 4, 1966 E. W. CLARK 3,277,370
TAUT BAND SUSPENDED INSTRUMENT MOVEMENT WITH SHOCK
RESISTANT LONGITUDINAL MOVEMENT STOP
Filed Dec. 28, 1962 3 Sheets-Sheet 3

INVENTOR.
EARL W. CLARK
BY *W. J. Shanley Jr.*
HIS ATTORNEY

United States Patent Office 3,277,370
Patented Oct. 4, 1966

3,277,370
TAUT BAND SUSPENDED INSTRUMENT MOVEMENT WITH SHOCK RESISTANT LONGITUDINAL MOVEMENT STOP
Earl W. Clark, Saugus, Mass., assignor to General Electric Company, a corporation of New York
Filed Dec. 28, 1962, Ser. No. 248,101
8 Claims. (Cl. 324—154)

This invention relates to taut band suspension instruments, and more particularly, to systems for protecting the suspension systems of such instruments from shock damage.

Taut band suspension instruments are characterized by the suspension of the moving assembly on two extremely fine metal bands which are held in tension by resilient anchors supported by the instrument frame. As is well known in the art, current passing through the instrument causes the moving element to rotate, twisting the bands and moving the instrument pointer. The counter-torque produced by this twisting action performs the function of the springs in a pivot and jewel suspension instrument.

Taut band suspension instruments are recognized as being inherently less sensitive to shock and vibration than pivot and jewel suspension instruments. However, there are many applications for which prior art taut band suspension instruments are not suitable because they can not withstand extreme conditions of shock and vibration to which they would be subjected. One of the major markets requiring such instruments is the military market with its extremely rigorous shock tests.

The most common form of shock damage to taut band suspension instruments is the rupture of the suspension bands due to the application of forces which exceed the ultimate tensile strength of the suspension bands. Such destructive forces are applied to the suspension bands as the instruments are subjected to extreme shocks if the magnitude of movement of the moving assembly is not effectively limited so as not to overstress the bands.

Rupture of the suspension bands is not the only form of shock damage that can occur to taut band suspension instruments which lack adequate stops. The moving assembly itself can be damaged due to an overhanging portion striking a stationary portion of the instrument such as the frame, the magnet, or a pole piece. The fragile nature of the moving assembly with many overhanging portions, necessitates a system of stops which will limit the movement of the moving assembly before it strikes a stationary part of the instrument.

Conventionally prior art systems for preventing both longitudinal and lateral movement of the shaft utilize combined longitudinal and lateral stops which are located at the opposed ends of the moving assembly. Such prior art systems have been found to be inadequate. I have discovered that one of the reasons for the failure of such systems is that such a system requires that the opposed stopping surfaces remain a fixed distance apart. This condition has been found to hold only when the instrument is subjected to shocks which a normal commercial instrument would be subjected. However, this condition does not hold at higher levels of shock which may be found in military applications. At these shock levels I have found that the fixed longitudinal stopping surfaces affixed to the frame at opposite ends of the moving assembly are subjected to relative movement with respect to each other due to flexure of the frame which results in increasing the limits of axial movement. This results in overstressing the suspension bands since the design limits on the longitudinal motion are determined by the maximum magnitude of longitudinal movement that can be tolerated before the bands rupture.

It is therefore an object of the invention to provide an improved system of stops for a taut band suspension instrument.

It is another object of my invention to provide a system of longitudinal stops for a taut band suspension instrument which limits the relative movement of the moving assembly with respect to the frame to a fixed predetermined amount even under conditions of instrument frame flexure.

It is a further object of my invention to provide a system of stops in which the opposed stopping surfaces which are secured to the instrument frame, are separated by a fixed distance which is not subject to change when heavy shocks are applied to the instrument.

In accordance with one form of my invention, frame-supported longitudinal stopping surfaces are provided by the opposed surfaces of a unitary member which projects from the instrument frame. These opposed surfaces in turn cooperate with the opposite sides of a groove in a collar mounted upon the shaft of the moving assembly to thus provide predetermined fixed limits of relative motion between the frame and the movable system.

In accordance with another form of my invention, frame-supported longitudinal stopping surfaces are provided by the opposed sides of a groove cut in a member projecting from the frame or core structure of the instrument. In accordance with this embodiment of my invention, the movable assembly stopping surfaces are provided by opposed surfaces of a flange on the shaft which also serves to support the moving vane of this embodiment.

The foregoing and other objects of the invention will be best understood from the following description of embodiments thereof, reference being had to the accompanying drawings wherein.

Figure 1:
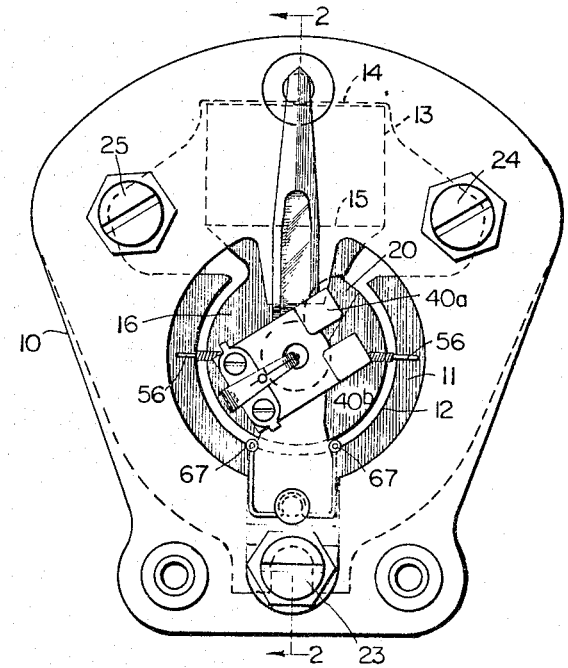
FIG. 1 is an end view of one form of a D.-C. instrument embodying my invention.

Referring now to FIG. 1, there is illustrated a fan-shaped magnetic system 10 having a solid outer yoke of magnetic material 11 which is shaped with a circular inner opening 12 to provide an outer pole piece. The magnetic system 10 further comprises longitudinally magnetized permanent magnet 13 having an end surface 14 which is secured to a mating surface on yoke 11. The opposed surface 15 of magnet 13 is in turn secured to inner pole piece 16 which is basically shaped in the form of an open hook. The opening in the hook is provided so that the moving armature assembly 19 may be mounted on the inner pole piece 16. When the armature assembly is mounted upon pole piece 16 shaft 18 and coil 17 may rotate with the active portion 17a of the coil within the air gap formed between the pole faces of pole pieces 11 and 16. After the armature assembly 19 is placed in its operative position, the gap in pole piece 16 is closed by the insertion of D-shaped rod 20.

Figure 2:
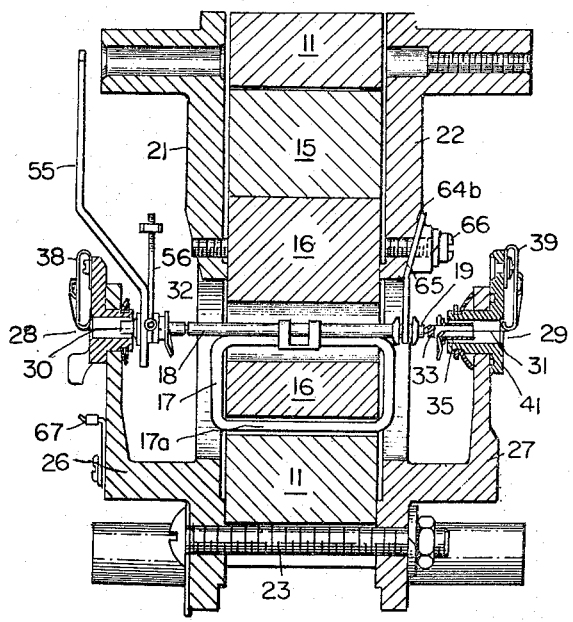
FIG. 2 is a sectional view of FIG. 1 taken along lines 2—2.

Referring now to FIG. 2, it can be seen that end plates 21 and 22 are clamped against opposite surfaces of the magnetic structure by bolts 23, 24 and 25 for providing supporting structure for the armature assembly. End plates 21 and 22 are respectively provided with arms 26 and 27 for supporting band guide and anchor assemblies 28 and 29 which respectively provide means for anchoring the outer ends of taut bands 30 and 31. The inner ends of taut bands 30 and 31 are secured to band guide and anchor assemblies 32 and 33 which are carried by hubs 34 and 35, respectively. Bands 30 and 31 have the proper amount of tension applied thereto by being soldered to springs 38 and 39 when they are deflected a predetermined amount when the armature assembly is properly positioned.

Figure 3:
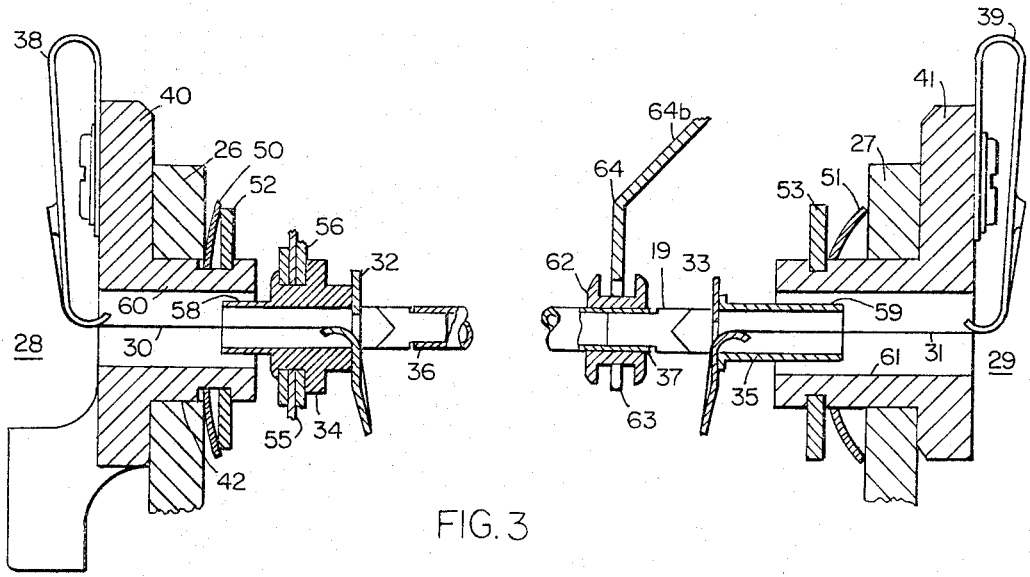
FIG. 3 is an enlarged sectional view taken along lines 2—2 of FIG. 1 showing details of the taut band suspension system and its system of stops in accordance with my invention.

Referring to FIG. 3, zero set bushing 40 which is rotatably received in aperture 42 of arm 26 has arms 40a and 40b which cooperate with a crank (not shown) to provide means for setting the zero point of the instrument after rear bushing 41 has been positioned. Insulating bushing 41 is supported in a similar manner by arm 27 so that it may be rotated to a desired position in order to allow the instrument to have its zero point set on the left, on the right, or any intermediate point of the scale. Spring washers 50 and 51 which bear against C-shaped clamps 52 and 53, respectively, provide means for retaining bushings 40 and 41 in the apertures in arms 26 and 27.

The angular position of the armature assembly 19 which is representative of quantity being measured is indicated by the position of pointer 55 which is secured to front hub 34. Balance assembly 56 which is also carried by hub 34 is for balancing the armature assembly 19 in accordance with well known techniques.

To summarize, armature assembly 19 is supported for rotation on bands 30 and 31 which are held in tension by springs 38 and 39 of the band guide and anchor assemblies 28 and 29 which are respectively supported by arms 26 and 27 of the instrument frame. Provisions for limiting the magnitude of longitudinal movement of armature assembly 19 are provided by stop means comprising a relatively short, stiff forked finger 64 in cooperation with collar 62, while cylindrical surfaces 58 and 59 of hubs 34 and 35 provide lateral stopping surfaces for the front and rear ends of assembly 19, respectively. The mating lateral stopping surfaces which are carried by the frame are provided by internal cylindrical surfaces 60 and 61 of bushings 40 and 41, respectively. When the proper amount of tension is exerted upon suspension bands 30 and 31 springs 38, 39 are deflected so that surfaces 58 and 59 are concentric with surfaces 60 and 61, respectively, thus providing equal limits of lateral motion in all lateral directions.

Collar 62, which is secured to shaft 18, is provided with a groove 63 having opposite sides which provide opposed longitudinal stopping surfaces or elements which are spaced in the direction of the axis of shaft 18. The longitudinal stopping surfaces of groove 63 in turn cooperate with the opposed surfaces of fork 64 to provide predetermined limits of travel. Means have been provided to position fork 64 so that it normally lies in the center of groove 63 in order to provide equal and opposite limits or stops which are engaged only under high shock conditions. For example, one method of properly positioning fork 64 with respect to groove 63 makes use of inclined surface 65. Once the free end of fork 64 is properly positioned within groove 63 it is secured in this position by tightening bolt 66 which is received in a tapped hole in plate 22.

It will be seen that since the opposed sides of groove 63 will remain a fixed distance apart even under conditions of high shock I have provided a system of longitudinal stops which is immune to flexure of the overhanging portions of the instrument frame, i.e., arms 26 and 27.

Pointer stops 67 have been provided to prevent the coil 17 from being damaged upon striking pole piece 16 at either one of its rotational limits.

Figure 4:
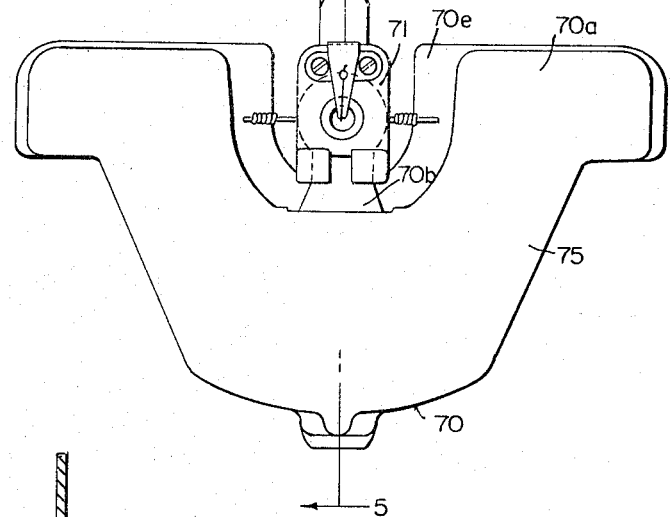
FIG. 4 is an end view of one form of an A.-C. instrument embodying my invention.
Figure 5:
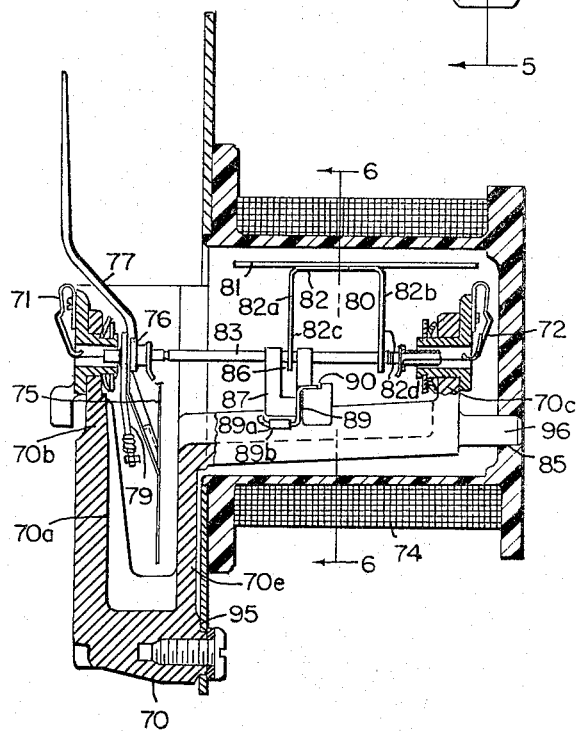
FIG. 5 is a sectional view taken along lines 5—5 of FIG. 4.
Figure 6:
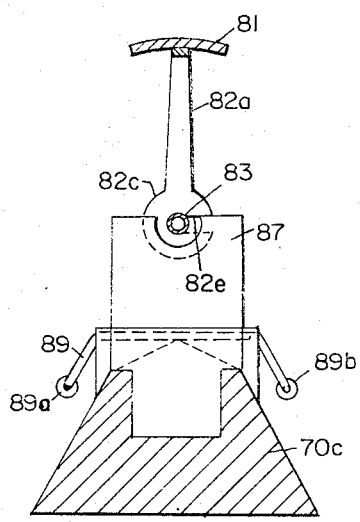
FIG. 6 is a partial sectional view taken along lines 6—6 of FIG. 5 which illustrates a taut band suspension system with a system of stops in accordance with my invention.

Reference may now be had to FIGS. 4, 5 and 6 which illustrate the application of the principles of my invention to an A.-C. taut band instrument.

Referring to FIGS. 4 and 5, front portion 70a of frame 70 carries an arm 70b which provides means for supporting the front band guide and anchor assembly 71. Rear band guide and anchor assembly 72 is in turn supported by L-shaped section 70c of frame 70 which projects rearwardly from section 70e of the frame.

No further description of the function of band guide and anchor assemblies 71 and 72 and hubs 76 and 77 is felt to be necessary since they are identical in construction and function with the band guide and anchor assemblies and hubs which were previously described.

The generally U-shaped cross sectional configuration formed by portions 70a and 70e of the frame is necessary to accommodate damping vane 75 which is mounted for rotation upon hub 76 between sections 70a and 70e which carry damping magnets. The damping magnets have not been illustrated for the sake of clarity of illustration since they form no part of my invention.

Armature assembly 80, which comprises vane 81 and its U-shaped supporting bracket 82, is supported for rotation within the magnetic field supplied by field coil assembly 74 by shaft 83. Armature assembly 80 is located in the proper position relative to field coil assembly 74 when boss 96 is located in aperture 85 and the rear face 95 of frame section 70e is secured to coil assembly 74 by any convenient means.

Support bracket 82 which is comprised of arms 82a and 82b is secured to shaft 83 by placing shaft 83 in the laterally extending U-shaped cutout portions of the hubs of arms 82a and 82b one of which, 82e, is shown in FIG. 6.

Referring now to FIG. 5, the hub of arm 82a is received in the slot 86 in raised portion 87 of section 70c which acts as a stop means. The limits of axial travel of shaft 83 and armature assembly 80 are determined by the difference between the width of slot 86 and the thickness of hub portion of arm 82a. Thus, it can be seen that since these dimensions are not subject to variations due to the application of shock to the instrument the limits of longitudinal motion of armature assembly 80 and shaft 83 will remain fixed in spite of any flexure of the frame.

Resilient wire 89 which is supported in slot 90 has terminal sections 89a and 89b which intersect the plane of support arm 82a thus providing means for limiting the rotational motion of armature 80 before it comes in contact with the sides of arm 70c or the bottom of slot 86.

Provision has been made to taper the bottom of slot 86 from the center towards both sides of projection 87 so that arm 82a will not strike the bottom of the slot before it comes in contact with stops 89a and 89b.

In accordance with my invention, D.-C. instruments constructed in accordance with the embodiment of FIGS. 1–3 and A.-C. instruments constructed in accordance with the embodiment of FIGS 4–6 have been found in practice to be sufficiently shock resistant to pass military shock tests which previous taut band suspension instruments failed completely or at best were only marginally successful.

In the instruments constructed in accordance with my invention the longitudinal and lateral stops were arranged to provide clearances of the order of .013 inch in either longitudinal direction or in any lateral direction, while the tension of the bands was set at 100 grams.

While there have been described what are at present considered to be preferred embodiments of the invention, it will be apparent to those skilled in the art that various changes and modifications may be made therein without departing from the spirit or scope of the invention.

What I claim as new and desire to secure by Letters Patent of the United States is:

1. A taut band suspension system comprising a frame member having first and second tension applying means secured thereto, means connected to said frame member for creating a magnetic field, an armature assembly suspended for rotation between a pair of suspension bands held in tension between said first and second tension applying means, said armature assembly comprising a shaft having opposed ends thereof secured to the inner ends of said suspension bands, an active element supported at a distance from said shaft for rotation in said magnetic field, first means connected to said frame member for limiting the lateral movement of one end of said shaft, second means connected to said frame member for limiting the lateral movement of the other end of said shaft, and means connected to said frame member and to a point on said shaft for limiting the longitudinal movement of said shaft in both directions, said longitudinal motion limiting means operating independently of said active element and comprising a first member having a groove therein and a cooperating second member having a projection which fits in said groove.

2. A taut band suspension system comprising a frame member having first and second tension applying means secured thereto, means connected to said frame member for creating a magnetic field, an armature assembly suspended for rotation between a pair of suspension bands held in tension between said first and second tension applying means, said assembly comprising a shaft having opposed ends thereof secured to the inner ends of said suspension bands, an active element supported at a distance from said shaft for rotation in said magnetic field, first means connected to said frame member for limiting the lateral movement of one end of said shaft, second means connected to said frame member for limiting the lateral movement of the other end of said shaft, and means connected to said frame and to a point on said shaft assambly for limiting the longitudinal movement of said shaft assembly in both directions, said longitudinal motion limiting means operating independently of said active element and comprising a first member having a groove therein, a second member having a projection shaped to fit into said groove and means for supporting said first and second members in cooperating relationship from said frame and shaft so as to limit the magnitude of the relative motion between said frame and shaft to an amount governed by the difference between the width of said groove and the thickness of said projection.

3. In a shock resistant measuring instrument, a taut band suspension system comprising a stationary frame member having first and second tension applying means secured thereto, means supported by said frame member for creating a magnetic field, a rotatable armature assembly including an active member disposed in said magnetic field suspended for rotation between a pair of suspension bands held in tension between said first and second tension applying means, said armature assembly comprising a shaft having opposed ends thereof secured to the inner ends of said suspension bands, and stop means arranged to limit longitudinal movement of said shaft to a predetermined range and thereby prevent impact engagement of said armature assembly and said frame assembly under shock conditions, said stop means comprising first and second stop members one of which is supported by said shaft, the other stop member being mounted on said frame assembly, the first stop member comprising a pair of stop elements spaced in the direction of said longitudinal shaft movement and the second stop member comprising a finger extending between said stop elements throughout the rotational limits of said assembly under normal conditions so as to normally lie in spaced relation therewith, said finger acting to engage said stop elements upon longitudinal movement of said shaft in either direction under shock conditions and thereby limit the longitudinal movement of said shaft to said predetermined range.

4. In a shock resistant measuring instrument, a taut band suspension system comprising a stationary frame member having first and second tension applying means secured thereto, means connected to said frame member for creating a magnetic field, a rotatable armature assembly suspended for rotation between a pair of suspension bands held in tension between said first and second tension applying means, said armature assembly comprising a shaft having opposed ends thereof secured to the inner ends of said suspension bands, an active element mounted on said shaft to rotate in said magnetic field, a first stop member having an annular groove therein which is secured to said shaft, said groove being of predetermined width, a second stop member secured to said frame assembly and having a projection shaped so as to fit in said groove in spaced relation with the sides thereof throughout the rotational limits of said assembly under normal conditions, said projection being of predetermined thickness, said predetermined width and said predetermined thickness being chosen so as to limit the longitudinal motion of said shaft with respect to said frame to a predetermined magnitude and thereby prevent the armature assembly from striking the frame assembly under shock conditions.

5. In a shock resistant measuring instrument, a taut band suspension system comprising a stationary frame member having first and second tension applying means secured thereto, means supported by said frame member for creating a magnetic field, a rotatable armature assembly including an active member disposed in said magnetic field suspended for rotation between a pair of suspension bands held in tension between said first and second tension applying means, said armature assembly comprising a shaft having opposed ends thereof secured to the inner ends of said suspension bands, a first stop member having an annular groove therein which is secured to said shaft, said groove being of predetermined width, a second stop member secured to said frame and having a projection shaped so as to fit in said groove and cooperate therewith throughout the rotational limits of said assembly, said projection being of predetermined thickness, said predetermined width and predetermined thickness being chosen so as to limit the longitudinal motion of said shaft with respect to said frame to a predetermined magnitude and thereby prevent the armature assembly from striking the frame assembly under shock conditions and additional stop members adjacent the ends of the shaft for limiting the lateral movement of the shaft.

6. In a shock resistant measuring instrument, a taut band suspension system comprising a stationary frame member having first and second tension applying means secured thereto, means supported by said frame member for creating a magnetic field, a rotatable armature assembly including a vane disposed in said magnetic field suspended for rotation between a pair of suspension bands held in tension between said first and second tension applying means, said armature assembly comprising a shaft having opposed ends thereof secured to the inner ends of the suspension bands, a supporting member for supporting said vane on said shaft and stop means comprising a pair of spaced stop elements mounted on said frame assembly and disposed on opposite sides of said vane supporting member to limit the longitudinal movement of said shaft and shaft assembly.

7. The combination of claim 6 in which said vane supporting member comprises a support element secured to the shaft of said assembly so as to provide an annular hub of predetermined thickness around a substantial portion of the circumference of said shaft, said hub lying in a plane normal to the axis of said shaft, and the spaced stop elements are formed by a projection from said frame having a slot therein, said projection being positioned so that said hub is centered in said slot, the width of said slot being chosen relative to the thickness of said hub so that the limits of longitudinal movement of the shaft will not exceed a predetermined magnitude and thereby prevent the armature assembly from striking the frame assembly under shock conditions.

8. The combination of claim 7 further comprising additional stop members adjacent the ends of the shaft for limiting the lateral movement of the shaft.

References Cited by the Examiner
UNITED STATES PATENTS

| | | | |
|---|---|---|---|
| 800,873 | 10/1905 | Northrup | 324—154 |
| 1,677,864 | 7/1928 | Jandus | 324—154 |
| 2,237,552 | 4/1941 | Ellis | 324—154 |

FOREIGN PATENTS 1,003,350  2/1957  Germany.

WALTER L. CARLSON, *Primary Examiner.*

R. V. ROLINEC, *Assistant Examiner.*